Figure 1:
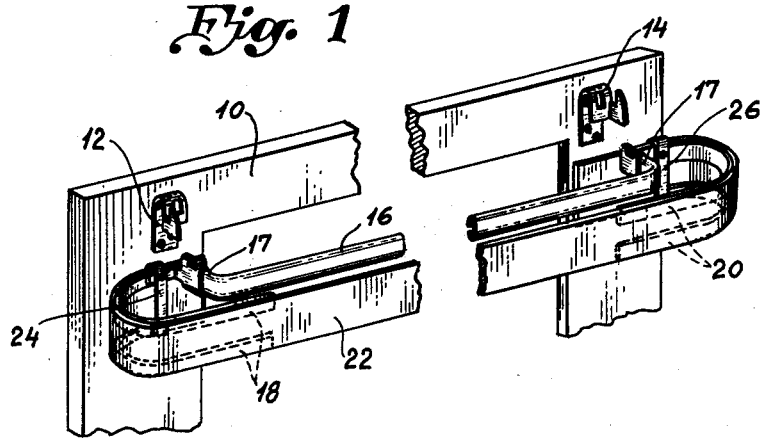

Nov. 19, 1963 J. H. BIERLICH 3,111,162
VALANCE ASSEMBLY
Filed Aug. 22, 1952 5 Sheets-Sheet 1

INVENTOR:
Johannes Harald Bierlich,
BY
His Agent.

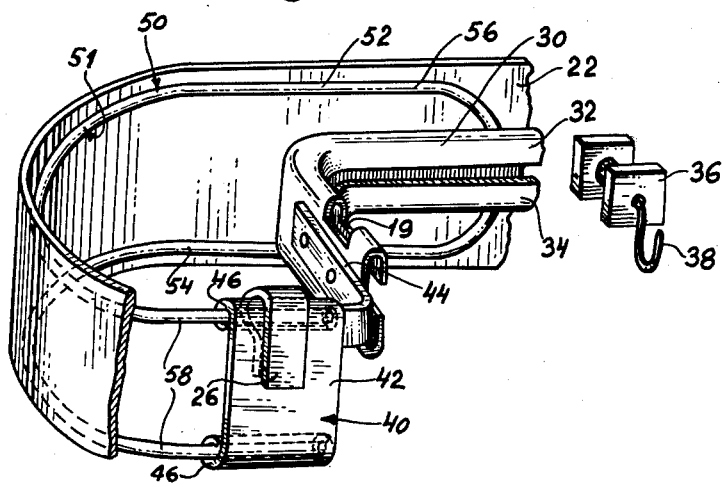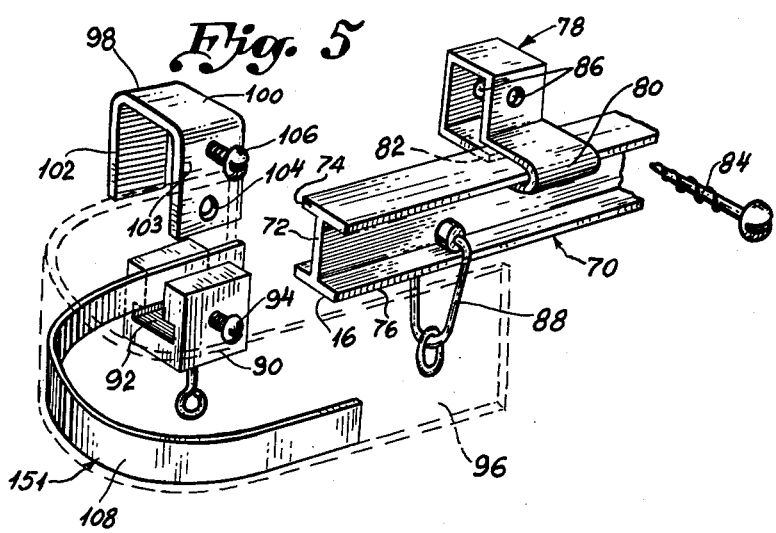

Nov. 19, 1963    J. H. BIERLICH    3,111,162
VALANCE ASSEMBLY
Filed Aug. 22, 1952    5 Sheets-Sheet 3
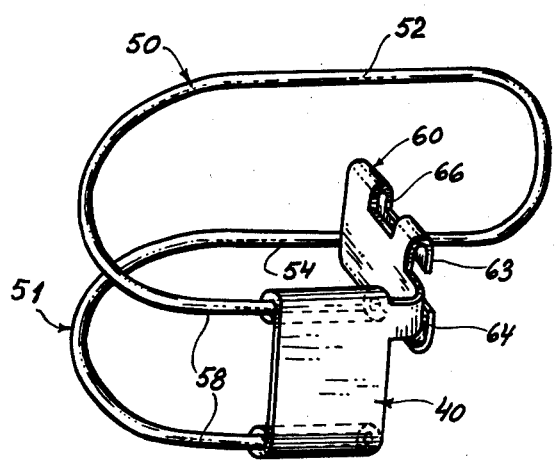
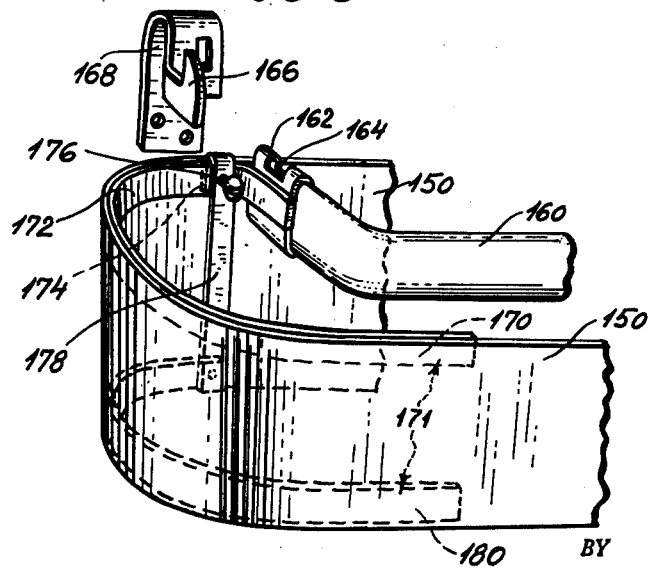
INVENTOR:
Johannes Harald Bierlich,
BY Nov. 19, 1963  J. H. BIERLICH  3,111,162
VALANCE ASSEMBLY
Filed Aug. 22, 1952 5 Sheets-Sheet 4
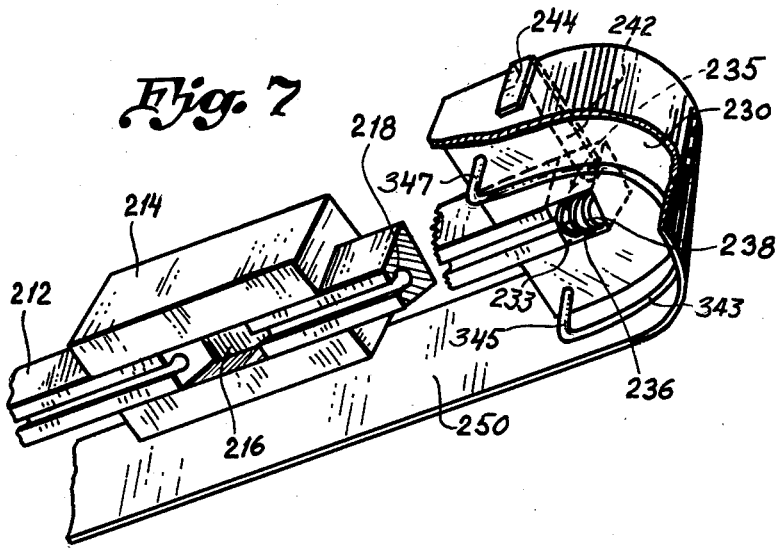
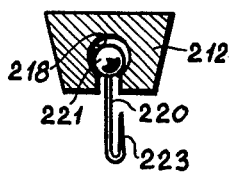
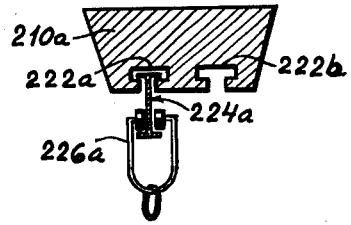
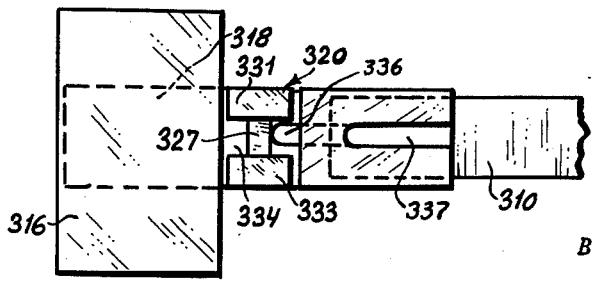
INVENTOR:
Johannes Harald Bierlich,
BY Nov. 19, 1963   J. H. BIERLICH   3,111,162
VALANCE ASSEMBLY
Filed Aug. 22, 1952   5 Sheets-Sheet 5

INVENTOR:
Johannes Harald Bierlich,
BY
His Agent.

United States Patent Office 3,111,162
Patented Nov. 19, 1963

3,111,162
VALANCE ASSEMBLY
Johannes Harald Bierlich, 15 Oresundshoj,
Copenhagen, Denmark
Filed Aug. 22, 1952, Ser. No. 305,892
7 Claims. (Cl. 160—19)

This invention relates to valance and curtain or drapery supports and more particularly to devices of the nature comprising a highly improved valance for hiding curtain rods, venetian blind top bars or like accessories extending across a window opening.

One object of the invention is to provide a cornice which is easy to manufacture and especially adapted to mass production.

Another object of the invention is to provide a cornice or valance, which includes a simple structure and a pair of supporting brackets and which can be mounted on the spot without any previous measuring or cutting to measure in advance.

Another object of the invention is to provide a cornice or valance which is designed to be fitted to window openings of different widths.

Still a further object of the invention is to provide a cornice which is easy to handle and does not need any cut to measure in any critical size.

Still another object of the invention is to provide a cornice which is specifically adapted to be stored so that a full stock of different finish to be carried by the supplier.

A further object of the invention is to provide a cornice assembly which includes the cornice and supporting brackets together with a curtain or drape support.

Still another object is to provide a cornice structure of the latter character which, as well as the cornice itself, is designed to be easily fitted to window openings of different widths.

Figure 2:
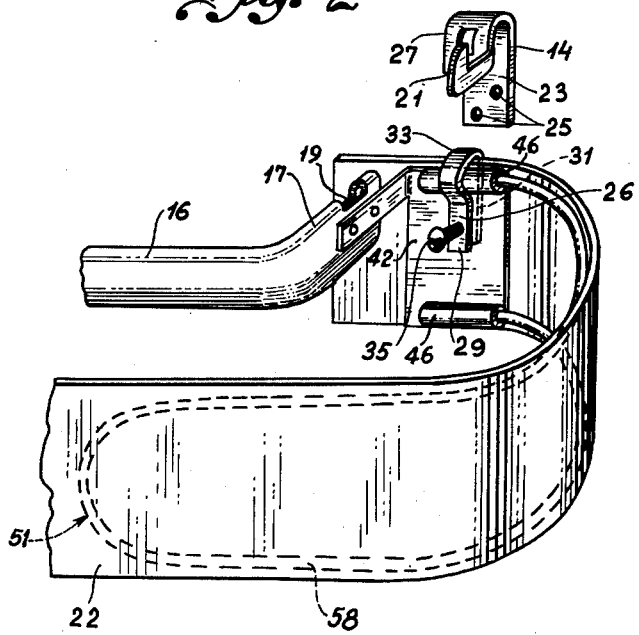
Figure 10:
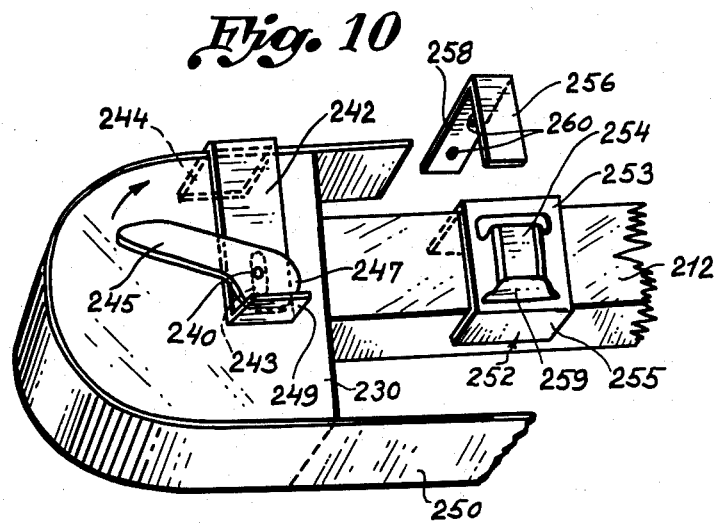
Figure 11:
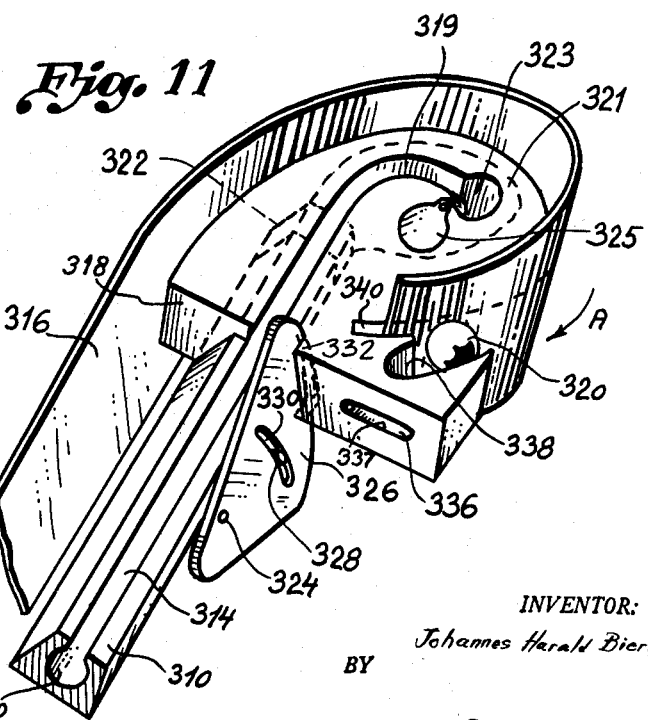

Further objects of the invention will appear from the following specification in connection with the drawing in which:

FIGURE 1 is a perspective view illustrating a cornice or valance structure according to the invention, FIGURE 2 is an enlarged perspective view of one end of the cornice structure shown in FIGURE 1, FIGURE 3 is a perspective view of the parts shown in FIGURE 2 seen from the rear side, FIGURE 4 is a perspective view of another embodiment of the cornice support, FIGURE 5 is a perspective view of the end parts of a curtain rail and cornice support in a further modified embodiment, FIGURE 6 is a perspective view showing a further modified embodiment, FIGURE 7 is a perspective view of still a further embodiment of a curtain rail showing the one end thereof seen from the bottom, FIGURE 8 is a cross section through the curtain rail shown in FIGURE 7, FIGURE 9 is a cross section through a modified embodiment of the curtain rail shown in FIGURE 7, FIGURE 10 is the arrangement shown in FIGURE 7 seen from the top side, FIGURE 11 is a further modification of my invention showing one end of the curtain rail seen from the bottom side, and FIGURE 12 is the embodiment shown in FIG. 11 seen in direction of the arrow A.

In broad terms my improved cornice structure comprises a cornice board comprising an elongated band or strip. Suitable clamping means are provided for receiving and clamping said strip adjacent either end and further means are provided for tensioning said strip longitudinally. Hereby a very simplified construction is obtained in which the cornice board comprises said band or strip which can be supplied from the dealer in long lengths to be cut off in the desired length in accordance with the size of the window. A pair of clamping brackets goes along with the strip for each window and the whole cornice structure can easily be mounted by the customer. Where in the following specification the word "strip" is used this term shall be understood as comprising an elongated band defining a cornice board capable of covering a curtain rail or other curtain suspension structure.

My improved cornice assembly comprises a cornice board strip 22, and a pair of brackets 12 and 14 which form means for tensioning said strip in longitudinal direction.

Referring now more specifically to FIGURES 1-3, 10 is the top part of a window frame. 12 and 14 are brackets for supporting a curtain rail 16 which in the particular embodiment shown in FIGURES 1-3 is of the conventional type usually having a rounded end. This curtain rail is in form of a profiled rail 30 having its edges rolled at 32 and 34 so as to form therebetween a slot to receive slidably arranged runners 36 having a hook member 38 for suspending the drapery or curtain (not shown). This type of curtain rails generally known, does not need to be more particularly described. The ends of the curtain rail are bent perpendicularly to the longitudinal direction of the rail so as to form short arms 17. As shown in FIGURES 2 or 3 there is an opening or a notch 19 in the rail to receive a hook formed end 21 of the bracket 14 so as to thereby support and carry the curtain rail. More particularly the bracket 14 is made of a stamped blank, which is bent in form of an inverted U, the body portion 23 of which is provided with screw holes 25 for securing the bracket to the window frame. The front leg 27 of the bracket has a forwardly extending member which ends in the hook formed member 21. Brackets of this type are as far as the hook formed member is concerned, commonly known, but the present embodiment of the bracket differs from the conventional constructions in that the body portion of the bracket is U-formed in the manner described.

To the bent curtain rail ends there are secured in any convenient manner such as by rivets, screws, spot welding or the like, a supporting member 40 for the cornice. The supporting member has a body portion 42 and an arm 44 bent substantially perpendicularly thereto and by means of which it is. The body portion 42 is, at its top and bottom edges rolled as at 46 so as to provide tubular sockets for receiving the ends of a wire bead 50, which in the embodiment shown in FIGURES 2 and 3, form the resilient support for the cornice band 22.

The wire bead 50 which preferably is a wire spring of steel or any other strong elastic material is double bent so as to form two legs 52 and 54 extending in opposite direction and is furthermore bent in U-form so as to have a portion 56 substantially parallel with the main body portion of the curtain rail extending adjacent the ends thereof in spaced relationship thereto and a rear portion 58 the ends of which are extending into the beads 46.

It will be understood that structures of this kind are provided at both ends of the curtain rail 16 so as to thereby form resilient heads 51 attached thereto.

The elongated band forming the valance or cornice is clamped to the resilient heads 51 by means of clamping members generally referred to as 24 and 26. As more clearly shown in FIGURES 2 and 3 the clamping member 26 is in the form of an U-shaped member having a leg 29 extending on the front side of the supporting member body portion 42 and another leg 31 extending on the rear side thereof. The top portion 33 of the clamping member 26 is widened so as to receive the adjacent bead 46. A set screw or the like 35 is provided in the front leg.

The valance itself is in form of the elongated strip or band 22 which may be a metal band or a band of any other suitable material such as thin flexible plywood. The band is clamped by putting its ends in between the rear surfaces of the supporting member body portions 42 and the appertaining clamping members and thereafter tightening the set screw 35. The specific U-form of the supporting brackets 12 and 14 enables the ends of the band to extend slightly beyond the ends of the curtain rail as will be apparent from FIGURE 2 with the result that the band 22 may tension to such an extent that the two resilient heads 51 are slightly deformed or compressed inwardly. It will be understood that by such deformation of the resilient heads 51 they will act on the elongated strap 22 to effect tensioning thereof which is sufficient to prevent it from hanging on or sagging at the middle even when suspended across a window of considerable width.

It will further be understood that the invention provides an extremely simple construction which is well designed for mass production. Instead of having a resilient head which has to be secured to the curtain rail by screws or rivets or in other convenient manner the supporting member 40 may, as seen in FIG. 4, have a portion 60 which has bent edges 63 and 64 in order to provide an interior C-section corresponding to the similar exterior section of the curtain rail so as to enable the supporting member 40 to be supported on the exterior of curtain rail ends. Preferably the supporting member portion 60 has an opening 66 for passage of the supporting bracket hook 21.

By this embodiment the whole structure can easily be assembled on the spot. It will be understood that no prior adjustment of the parts is necessary. The dealer simply delivers the two supports to be secured to or arranged on the curtain rail ends together with the springs forming the resilient heads 51 to be pushed in and secured in place on the supporting members. The band or strip may be cut off at the spot from a supply in form of a roll of the material in question. No critical measuring is necessary.

My invention also provides for a plurality of variations with respect to decorative finishing of the cornice. In case of a metal band or strip the surface may be lacquered or otherwise treated in a variety of colors and finishes. In case of a strip made from flexible plywood a variation of surface finishes is also available. It will furthermore be understood that the surface of the strip can be coated by wall paper with the result that the cornice matches the decoration of the room.

As to the embodiment shown in FIGURE 5 there is only shown one end of a curtain rail of another conventional type. The curtain rail which is here referred to as 70 is in form of an I-rail having a body portion 72, a top flange 74 and a bottom flange 76. A bracket 78 is bent in the form shown having portions 80 and 82 gripping around the top flange so that the curtain rail is suspended by means of a screw 84 adapted to be inserted through screw holes 86 in the body portion of the bracket 78. Suitable runners 88 are movably supported on the bottom flange 76. At the end of the curtain rail a supporting and clamping member 90 is secured. This member has a slot 92 corresponding in size to the bottom flange 76 in a part of the rail body portion 72 so as to enable it to be pushed on the end of the curtain rail. Between the curtain rail body portion 72 and one side wall of the slot 92 a spring 108 is clamped. The clamping is effected by means of a set screw 94. The member 90 in FIGURE 5 corresponds to the member 40 in FIGURES 2 and 3. The elongated cornice band or strip which in FIGURE 5 is referred to by 96 is clamped against the rear surface of the member 90 by means of a suitable clamping member 98 in form of a downwardly open clamp having a body portion 100, a rear leg 102 and a front leg 103 provided with an opening 104 for the passage of the set screw 94 and a screw threaded hole for another set screw 106 to be tightened against the front surface of the member 90 so that the band between the interior surface of the clamp leg 102 and the rear surface of the leg 103 is being clamped.

Between the body portion 72 of the curtain rail 70 and the slot of the member 90 there is clamped an arcuate leaf spring 108 which corresponds to the spring member 50 in FIGURES 2 and 3 and forms a resilient head 151 serving the purpose of tensioning the cornice strip and band in the same manner as described with reference to FIGURES 2 and 3. Though only one end of the curtain rail is shown it will be understood that the other end is correspondingly constructed so that the necessary tensioning of the cornice is being obtained.

A further modification of the system is shown in FIGURE 6. Here the curtain rail is referred to by 160. This is of the same type as that shown in FIGURES 2 and 3. To support the curtain rail there is provided a bracket 168 which has a forwardly extending hook 166 to engage in the rear end of the bent curtain rail portion. This portion is provided with an opening 164 for the passage of the tip of the hook. This part of the structure corresponds to that shown in FIGURES 2 and 3.

On the end of the curtain rail a sleeve member 162 of the type shown in FIGURE 4 having an aperture corresponding to the hook aperture 164 in the curtain rail is arranged. As in the case of FIGURE 4 the sleeve member 162 is of an interior configuration corresponding to the exterior profile of the curtain rail so that the sleeve can be pushed over the end of the rail and held in position simply by the passage of the hook through the sleeve opening when the latter is in alignment with the hook opening in the curtain rail.

The sleeve 162 is provided with an extension 172 formed by resilient material which is bent to form an arcuate member having its end portion 170 spaced from the curtain rail in parallel relationship thereto. Riding on the extension 172 adjacent its connection with the sleeve member 162 a strip 178 is arranged the top of which is U-bent at 174 and provided with a set screw 176 enabling the member 178 to be held firmly in position clamped against the member 172.

At the lower end of the strip 178 another resilient member 180 is secured. This member may be connected with the strip 178 by a rivet spot welding or in other convenient manner. The member 180 is of a similar configuration as the member 172, 170 in order to form together with the latter a resilient arcuate head 171 which supports and tensions the cornice band or strip 150 which is held in position by the clamping action between the interior surface of the portion 174 and the rear surface of the extension 172 when the screw 176 is tightened.

Still another embodiment is shown in FIGURES 7 through 10. Here the curtain rail is referred to by 212 and is of the type comprising an elongated rod having a bottom groove 218. The cross section of the curtain rail is more clearly shown in FIGURE 8 in which is also shown a runner 220 having a ball formed head 221 and a hook 223 for suspending the curtain.

As appears from FIGURE 8 the cross section of the curtain rail is trapezoidal. In order to assemble the curtain rail from pieces of standard size there may as indicated in FIGURE 7, by provided, a sleeve member 214 which has a groove corresponding in cross section to the exterior configuration of the curtain rail so that it enables two curtain rail lengths to be assembled simply by pushing them together into the slot 216 of the sleeve member.

On the end of the curtain rail an arcuate head 230 is arranged. This has a plane surface in which is provided a slot 233 comprising a recess corresponding to the exterior cross section of the curtain rail and terminating in the interior of the head spaced from its arcuate end surface. Between the end 235 of the curtain rail and the end wall of the slot 233 a spring 236 is arranged. The arcuate head on the rail together with a corresponding one at the other end of the curtain rail forms the support for the cornice band or strip 250 the end of which is bent around the arcuate head and arranged under a bent end 244 of a clamping arm 242 which is arranged on the top side of the arcuate head. The arm 242 is provided with a slot 243 (see FIG. 10) through which a screw 240 is extending. This screw also extends through a hole in a swingingly arranged arm 245 having a cam portion 247 adapted to cooperate with an abutment 249 extending upwardly from the end of the arm 242 remote from the clamping section 244 thereof. The slot 243 serves the purposes of giving the arm 242 a certain play sufficient to put the cornice band 250 in position. The clamping is then effected by turning the pivotable arm 245 in direction of the arrow shown adjacent the end thereof. By mounting the band or strip forming the cornice the latter is first bent and secured at one end of the curtain rail. Thereafter the two supporting head springs 236 are compressed and the clamping of the band is effected at the other end, whereafter the compression of said springs is relieved so that the two springs will press outwardly and tighten the band.

In order to mount the combined cornice and curtain rail structure two or more supporting members of which only one is shown and referred to by 252 are mounted on the curtain rail. The suspending member 252 is provided with a body portion 253 and two legs 255 bent downwardly and slightly inwardly so as to fit on the curtain rail sides. In the body portion 253 a part of the material is stamped out of its plane at 254 in order to form a channel 259 for passage of a supporting member 256 in form of an angular strip having another portion 258 bent perpendicular to the portion 256. In the portion 258 there is provided screw holes 260 for securing the member 256, 258 on the window frame.

In case of a cornice band of considerable width it may be convenient to provide a support also adjacent the lower edge of the band. For this purpose arcuate springs 343 may be secured on the respective bottom surfaces of the arcuate heads, as shown in FIGURE 7. The spring here is in form of a resilient wire bent in a configuration corresponding to the periphery of the arcuate head 230 and has its end bent at 345 and 347 and secured in corresponding holes in the bottom side of the arcuate head.

Though the embodiment described with reference to FIGURES 7, 8 and 10 is substantially adapted to curtain rails made of wood, it will be understood that the same embodiment can be used in connection with metal rails or rails of other materials.

A modification is shown in FIGURE 9 in which the curtain rail, here referred to as 210a is provided with two T-formed slots each of which is adapted to receive and hold in position the top flange of an I-type curtain rail of the embodiment shown in FIGURE 5 and which may be provided with runners such as 226a.

Still another embodiment is shown in FIGURES 11 and 12. Here the curtain rail 310 is provided with a longitudinal groove 314 in its bottom surface. The groove is, as also in the case of FIGURES 7 and 8 of the type which has a cylindrical portion 312 communicating with a slot 314 in order to receive a plurality of ball headed or the like type runners, one embodiment of which is shown in FIG. 8.

On the end of the curtain rail an arcuate head 318 is secured. This has a slot 322 adapted to receive the end of the curtain rail 310. The slot 322 extends from its bottom surface of this head and is adapted to receive the end of the curtain rail 310. In contrast to the embodiment shown in FIGURES 7, 8 and 10 the grooved bottom surface of the curtain rail is not exactly in alignment with the bottom surface of the arcuate head but spaced for instance ⅛″ therefrom. The arcuate head provides in its exterior in communication with the slot 322 receiving the curtain rail end a cavity 321 communicating with an arcuate extension 319 of the curtain rail slot 314. A widening of the extension 319 is provided at 323 enabling the runners to be put in therethrough. A suitable closure member for instance, in form of a small plate 325 is arranged adjacent the input opening 323 to be turned to a position to close the latter to prevent hte curtain rail runners from falling out. At the rear side of the arcuate head 318 a slot 340 adapted to receive an end edge of a cornice band or strip 316 is provided. Adjacent the slot 340 an aperture 338 is provided to receive a clamping member 320 in the form of a cylindrical member having a body portion 327 and top and bottom flanges 331 and 333 respectively. The aperture 338 narrows at its entrance in order to prevent the spool member 320 from being taken out. The member 320 is kept in position by means of a wedge or the like 336 that passes through a slot 337 of the head 318 and which extends between the end flanges thereof as most clearly shown in FIGURE 12.

Adjacent the entrance of the channel 322 adapted to receive the curtain rail a slot 332 adapted to receive an arcuate cam member 326 is provided pivotally arranged on the inclined rear surface of the curtain rail by means of a screw or the like 324 and guided by a pin or screw 328 in an arcuate slot 330.

In this embodiment the mounting and tightening of the cornice band or strip 316 is effected in the following manner:

The two arcuate heads of which only one needs to be provided with the cam member 326 are placed in position and pushed in as far as they can be at both ends of the curtain rail. Hereafter the band is cut approximately to length and inserted at one end into the slot 340 in one head whereafter the clamping member 320 is shifted in direction of the opening of the slot 338. The slot extension narrows in direction of the opening and consequently the spool cannot be withdrawn but will clamp firmly the end of the band.

Thereafter the band is cut at the other end and secured to the other head in a similar manner. After the band is secured the cam member 326 is turned. This will result in moving one of the two supporting heads away from the other with the result that the band is tensioned. Thereafter the cornice and curtain rail structure is mounted in suitable supporting brackets for instance as shown in FIGURE 10.

It will be realized that though having here described a variety of embodiments of my invention the latter is not restricted to the specific embodiments shown and described so that also further embodiments and variations will be possible within the scope of the appended claims.

I claim:

1. In a cornice in combination: a curtain rail, brackets secured to said curtain rail adjacent the ends thereof, an elongated strip defining a cornice board, means for clamping said elongated strip adjacent its ends to said brackets in substantially parallel relationship with said curtain rail and means for tensioning said strip longitudinally.

2. A cornice assembly comprising supporting brackets, a curtain rail adapted to be supported on said supporting brackets, resilient heads supported adjacent the ends of said curtain rail, an elongated strap defining a cornice board supported on said resilient heads and means clamping said elongated strap adjacent its ends to said heads and deforming same inwardly thereby tensioning said strap in longitudinal direction.

3. In combination: a curtain rail, brackets secured to said curtain rail adjacent the ends thereof, an elongated cornice board, means for clamping said elongated board adjacent its ends to said rail, said means being supported by said brackets and holding said strip in substantially parallel relationship with said curtain rail and means for tensioning said board in longitudinal direction.

4. The combination of a curtain rail, an elongated cornice board, supporting members for said elongated board attached to said curtain rail adjacent the ends thereof, means for clamping said elongated board adjacent its ends against said supporting members in substantial parallel relationship with said curtain rail and means for tensioning said board in longitudinal direction.

5. The combination of a curtain rail, and a cornice structure comprising an elongated flexible band shaped cornice strip, resilient members supported on said curtain rail adjacent the ends thereof, means for supporting said elongated cornice strip adjacent its ends on said resilient members is substantially parallel relationship with said curtain rail and tensioning said cornice strip in a longitudinal direction by means of said resilient members.

6. The combination of a curtain rail, an elongated cornice board strip, supporting members for said elongated strip carried by said curtain rail adjacent the ends thereof, means for securing said elongated strip to said supporting members adjacent its ends in substantially parallel relationship with said curtain rail and means acting on at least one of said supporting members and tensioning said strip longitudinally.

7. A cornice assembly comprising a curtain rail, supporting means for said curtain rail, resilient heads supported adjacent the ends of said curtain rail, an elongated cornice board supported on said resilient heads and means for clamping said elongated board adjacent its ends to said resilient heads and deforming same thereby tensioning said board longitudinally.

References Cited in the file of this patent

UNITED STATES PATENTS

| | | |
|---|---|---|
| 1,204,662 | Hills | Nov. 14, 1916 |
| 1,259,922 | Starr | Mar. 19, 1918 |
| 1,272,959 | Jarvik | July 16, 1918 |
| 1,306,099 | Brown | June 10, 1919 |
| 1,686,141 | Blakely | Oct. 2, 1928 |
| 1,909,494 | Hammonds | May 23, 1933 |
| 2,595,478 | Nealis | May 6, 1952 |

FOREIGN PATENTS

| | | |
|---|---|---|
| 171,283 | Switzerland | Nov. 1, 1934 |